United States Patent
Buchel et al.

[15] 3,689,664
[45] Sept. 5, 1972

[54] ARTHROPODICIDAL COMPOSITIONS AND METHODS OF COMBATTING ARTHROPODS USING N-CARBONIC ACID DERIVATIVES OF CYANO CONTAINING 1,2-DICARBONYLPHENYLHYDRAZONES

[72] Inventors: Karl Heinz Buchel; Wilfried Draber, both of Wuppertal-Elberfeld; Ingeborg Hammann, Cologne, all of Germany

[73] Assignee: Farbenfabriken Bayer Aktiengesellschaft, Leverkusen, Germany

[22] Filed: April 6, 1971

[21] Appl. No.: 131,832

Related U.S. Application Data

[62] Division of Ser. No. 785,391, Dec. 19, 1968, Pat. No. 3,627,816.

[52] U.S. Cl..................................424/304, 424/303
[51] Int. Cl...........................A01n 9/14, A01n 9/20
[58] Field of Search............................424/303, 304

Primary Examiner—Jerome D. Goldberg
Assistant Examiner—Allen J. Robinson
Attorney—Burgess, Dinklage & Sprung

[57] ABSTRACT

N-carbonic acid derivatives of 1,2-dicarbonylphenylhydrazones, i.e. N-((alkoxy, phenoxy, alkylmercapto, cyclohexyloxy and dialkylamino- -carbonyl and -thiono)-N-(alkyl- and/or electro-negative substituent [e.g. halo, haloalkyl, nitro and/or alkyl sulfonyl]- -substituted phenyl)-N'-(α-cyano-α-[alkanoyl and carboalkoxyl]-carbonyl)-hydrazones, which possess arthropodicidal, especially acaricidal and insecticidal, properties and which may be produced by reacting the corresponding alkali metal salt of a 1,2-dicarbonylphenylhydrozone, or such 1,2-dicarbonylphenylhydrozone in the presence of an acid-binding agent, with the corresponding carbonic acid chloride.

10 Claims, No Drawings

ARTHROPODICIDAL COMPOSITIONS AND METHODS OF COMBATTING ARTHROPODS USING N-CARBONIC ACID DERIVATIVES OF CYANO CONTAINING 1,2-DICARBONYLPHENYLHYDRAZONES

This application is a division of U.S. application Ser. No. 785,391, filed Dec. 19, 1968 which is now U.S. Pat. No. 3,627,816—12-14-71.

The present invention relates to and has for its objects the provision for particular new N-carbonic acid derivatives of 1,2-dicarbonylphenylhydrozones, i.e. N-(alkoxy, phenoxy, alkylmercapto, cyclohexyloxy and dialkylamino- -carbonyl and -thiono)-N-(alkyl- and/or electronegative substituent [e.g. halo, haloalkyl, nitro and/or alkyl sulfonyl]- -substituted phenyl)-N'-($\alpha$-cyano-$\alpha$-[alkanoyl and carboalkoxy]-carbonyl)-hydrozones, which possess arthropodicidal, especially insecticidal and acaricidal, properties, active compositions in form of mixtures of such compounds with solid and liquid dispersible carrier vehicles, and methods for producing such compounds and for using such compounds in a new way especially for combating pests, e.g. arthropods, with other and further objects becoming apparent from a study of the within specification and accompanying examples.

It is known that certain phenylhydrazones of dicyanoketone, for example $\alpha,\alpha$-dicyanocarbonyl-(2,5-dichlorophenyl)-hydrazone, can be used for the control of insects and mites (see U.S. Pat. No. 3,157,569).

It has been found in accordance with the present invention that the particular new N-carbonic acid derivatives of 1,2-dicarbonylphenylhydrazones of the general formula $$\begin{array}{c} Z_m \\ \langle \text{phenyl} \rangle - N - N = C \begin{array}{c} X \\ C = Y \end{array} \\ \begin{array}{c} | \\ A = C - B \end{array} \quad \begin{array}{c} \| \\ O \end{array} \end{array} \quad (I)$$

in which
X is cyano,
Y is $C_{1-4}$ alkyl or $C_{1-4}$ alkoxy,
Z, each individually, is a $C_{1-4}$ alkyl or electronegative substituent (i.e. if m is greater than 1 the various Z substituents may be the same or different),
m is 1,2,3,4 or 5,
A is oxygen or sulphur, and
B is $C_{1-10}$ alkoxy, phenoxy, $C_{1-6}$ alkylmercapto, cyclohexyloxy or di- $C_{1-4}$ alkyl-amino, exhibit strong arthropodicidal, especially insecticidal and acaricidal, properties.

It is very surprising that the carbonic acid derivatives of 1,2-dicarbonylphenylhydrazones according to the present invention exhibit stronger insecticidal and acaricidal effectiveness than the chemically very similar phenylhydrazones previously known.

The present invention also provides a process for the production of N-carbonic acid derivatives of the formula(I) above which comprises a. reacting an alkali metal salt of a 1,2-dicarbonylphenylhydrazone of the formula $$\left[ \begin{array}{c} Z_m \\ \langle \text{phenyl} \rangle - \overset{\ominus}{N} - N = C \begin{array}{c} X \\ C - Y \\ \| \\ O \end{array} \end{array} \right] Alk^{\oplus} \quad (II)$$

in which
X, Y, Z and m are the same as defined above, and
Alk is a sodium or potassium cation,
optionally in the presence of a polar solvent, with a derivative of a carbonic acid chloride of the formula $$\begin{array}{c} Cl \\ | \\ A = C - B \end{array} \quad (III)$$

in which
A and B are the same as defined above, or b. reacting a 1,2-dicarbonylphenylhydrazone of the formula $$\begin{array}{c} Z_m \\ \langle \text{phenyl} \rangle - N - N = C \begin{array}{c} X \\ C - Y \\ H \end{array} \\ \begin{array}{c} \| \\ O \end{array} \end{array} \quad (IV)$$

in which
X, Y, Z and m are the same as defined above in a polar solvent in the presence of an equivalent of an acid-binding agent with a derivative of a carbonic acid chloride of formula (III) above.

Taking the potassium salt of cyano-carboethoxy-carbonyl-(2-chloro-5-trifluoromethyl-phenyl)-hydrazone (IIa) and chloroformic acid n-butyl ester (IIIa) as examples of starting materials according to variant (a) of the production process, then the reaction takes place as set forth in the following formula scheme:

$$\left[ \begin{array}{c} CF_3 \\ \langle \text{phenyl} \rangle - \overset{\ominus}{N} - N = C \begin{array}{c} CN \\ CO_2C_2H_5 \end{array} \\ Cl \end{array} \right] K^{\oplus} + Cl - \overset{O}{\underset{\|}{C}} - OC_4H_9 \longrightarrow$$

(IIa)     (IIIa)

$$\begin{array}{c} CF_3 \\ \langle \text{phenyl} \rangle - N - N = C \begin{array}{c} CN \\ CO_2C_2H_5 \end{array} \\ Cl \\ O = C - OC_4H_9 - n \end{array} + KCl$$

(I₁)

The reaction according to variant (b) proceeds in analogous manner.

Advantageously, in accordance with the present invention, in the various formulae herein:

X represents
cyano;
Y represents
$C_{1-4}$ alkyl such as methyl, ethyl, n- and iso-propyl, n-, iso-, sec.- and tert.-butyl, and the like, especially tert.-butyl; or
$C_{1-4}$ alkoxy such as methoxy, ethoxy, n- and iso-propoxy, n-, iso-, sec-and tert.-butoxy, and the like, especially $C_{1-2}$ alkoxy;
m is a whole number from 1 to 5 inclusive, especially from 1 to 3;
each Z individually represents
a $C_{1-4}$ alkyl substituent such as methyl to tert.-butyl inclusive, and the like, as defined above for Y, especially $C_{1-2}$ alkyl, and more especially methyl; or
an electronegative substituent including
halo and as chloro, bromo, fluoro and iodo, especially chloro;
halo $C_{1-2}$ alkyl having 1–5 halo groups such as mono to penta chloro-, bromo-, fluoro- and iodo- -$C_{1-2}$ alkyl, especially mono to tri chloro-, bromo-, fluoro- and iodo- -methyl and mono to penta chloro-, bromo-, fluoro-and iodo- -ethyl, more especially mono to tri fluoro -methyl and -ethyl, and particularly tri fluoromethyl;

nitro; or $C_{1-4}$ alkylsulfonyl such as methyl to tert.-butyl inclusive, and the like, as defined above for Y, -sulfonyl, especially $C_{1-2}$ alkylsulfonyl, and more especially methyl sulfonyl;

such that where m is more than 1, i.e. 2–5, especially 2–3, Z represents the same or different, i.e. including mixtures of, $C_{1-4}$ or $C_{1-2}$ alkyl and/or electronegative substituents as defined above;

including 1–3 halo or preferably 1–3 chloro, 1–3 halo- $C_{1-2}$ alkyl having 1–5 halo groups or preferably 1–3 fluoro-$C_{1-2}$ alkyl having 1–5 fluoro groups, or particularly 1–3 or 1–2 trifluoromethyl, 1–3 or 1–2 nitro, 1–3 $C_{1-4}$ or $C_{1-2}$ alkyl sulfonyl; as well as 2–3 mixed $C_{1-4}$ or $C_{1-2}$ alkyl- -halo or chloro,-halo or fluoro $C_{1-2}$ alkyl having 1–5 halo groups or -trifluoromethyl, -nitro, and -$C_{1-4}$ or $C_{1-2}$ or methyl sulfonyl; 2–3 mixed halo or chloro- -halo or fluoro $C_{1-2}$ alkyl having 1–5 halo groups or -trifluoromethyl, -nitro, and -$C_{1-4}$ or $C_{1-2}$ or methyl sulfonyl; 2–3 mixed halo or fluoro $C_{1-2}$ alkyl having 1–5 halo groups- or trifluoromethyl- -nitro, and -$C_{1-4}$ or $C_{1-2}$ or methyl sulfonyl; or 2–3 mixed nitro- $C_{1-4}$ or $C_{1-2}$ or methyl sulfonyl; in particular in corresponding 2-, 3-and 4- as well as 2,3-, 2,4-, 2,5-, 2,6-, 2,3,4-, 2,3,5-, 2,3,6-, 2,4,5, 2,4,6-, 3,4,5-, 2,3,4,5-, 2,3,4,6-, 2,3,5,6-, and the like, nuclear positions;

A represents
oxygen; or
sulfur; and
B represents $C_{1-10}$ alkoxy such as methoxy to tert.-butoxy inclusive, as defined above for Y, pentyl, hexyl, heptyl, octyl, isooctyl, i.e. 2,2-dimethyl-n-hexyl,nonyl,decyl, and the like, especially $C_{1-8}$ or $C_{1-6}$ or $C_{1-4}$ alkoxy; preferably where A is oxygen;

phenoxy; preferably where A is oxygen;

$C_{1-6}$ alkylmercapto such as methyl-, ethyl-, n-and isopropyl-, n-, iso-, sec- and tert,-butyl-, pentyl- and hexyl-mercapto, especially $C_{1-4}$ or $C_{1-2}$ alkylmercapto, more especially ethylmercapto;preferably where A is oxygen;

cyclohexyloxy preferably where A is oxygen; or di $C_{1-4}$ alkylamino such as the same or mixed dimethyl to tert.-butyl inclusive, as defined above for Y,- amino,especially di $C_{1-2}$ alkylamino, and more especially dimethylamino; preferably where A is sulfur.

91 accordance with a particular embodiment of the present invention, X is cyano; Y is $C_{1-4}$ alkyl or tetr.-butyl, or $C_{1-4}$ or $C_{1-2}$ alkoxy; m is 1–3; (Z)$_m$ includes $C_{1-4}$ alkyl, 1–3 halo or chloro, 1–3 or 1–2 halo- or fluoro- -$C_{1-2}$ alkyl having 1–5 or 1–3 halo or fluoro groups and particularly 1–2 trifluoromethyl, 1–3 or 1–2 nitro,1–3 or 1–2 $C_{1-4}$ or $C_{1-2}$ alkysulfonyl and preferably 1–2 methylsulfonyl, as well as 1–3 mixed such $C_{1-4}$ alkyl, halo,halo- $C_{1-2}$ alkyl, nitro and $C_{1-4}$ alkyl-sulfonyl, especially chloro- and dichloro- -trifluoromethyl and -nitro, and dimethyl-nitro, and specifically 2-chloro, 3,4- and 3,5-dichloro, 2,3,5- and 2,4,5-trichloro, 3,5-bis(trifluoromethyl), 4-nitro and 2,4-dinitro, 4-methyl sulfonyl, 2-chloro-5-trifluoromethyl, 2-trifluoromethyl-4-chloro, 2,6-dichloro-4-nitro, 2,4-dimethyl-6-nitro, etc.; A is oxygen or sulfur; and B is $C_{1-10}$ or $C_{1-8}$ alkoxy, phenoxy, $C_{1-6}$ or $C_{1-4}$ alkylmercapto, cyclohexyloxy or di $C_{1-4}$ or $C_{1-2}$ alkylamino, with A preferably being oxygen where B is such alkoxy, phenoxy, alkylmercapto or hydrogen and with A preferably being sulfur where B is such dialkylamino.

The phenylhydrazones serving as starting materials are clearly characterized by the formulae (II) and (IV) above.

The alkali metal salts of 1,2-dicarbonylphenylhydrazones of the formula (II) are still new. They can, however, be prepared in simple manner from the corresponding phenylhydrazones of formula (IV) by stirring one equivalent of the hydrazone of formula (IV) with one equivalent of potassium hydroxide or sodium hydroxide in ethanol at 20° to 40°C and concentrating the reaction product until crystallization occurs. The salt obtained is expediently dried at a very high temperature. An appropriate example of such a preparation is described hereinafter as part of Example 8.

The phenylhydrazones of the formula (IV) are likewise not yet known. They can be prepared in simple manner by various processes.

In the most expedient process, an appropriate diazotized amino is reacted at temperatures between about −20° and +30°C and a pH of preferably 4 to 8, optionally in a solvent such as water or alcohol, with an appropriate active methylene compound, an acid-binding agent such as sodium acetate or sodium carbonate expediently being added to bind the acid which is formed (compare U. S. patent application Ser. No. 762 155 of Sept. 24, 1968). An appropriate example of such a preparation is described hereinafter as part of Example 9.

The phenylhydrazones of the formula (IV) can alternatively be prepared by reacting appropriate diazotization products of amines with appropriate 2-halo-1-carbonyl-3-methylcarbonyl compounds in the same manner as stated above for the active methylene compound process. The halogen compounds obtained can be reacted with alkali metal cyanide, azide and nitrate to give the appropriate cyano, azide and nitro compounds (compare U.S. patent application Ser. No. 762 155 of Sept. 24, 1968).

The carbonic acid derivatives of the formula (III) used as starting materials in the production process of the present invention are already known.

Polar inert organic solvents are used as diluents for variant (b), and may also be used as diluents for variant (a), of the production process of the invention. Such solvents include, in particular, nitriles (such as acetonitrile); ketones (such as acetone); formamides (such as dimethyl formamide); ethers (such as diethyl ether, tetrahydrofuran and dioxan); and the like.

In variant (b) of the production process an acid-binding agent is used. Particularly suitable acid-binding agents are tertiary amines, such as triethylamine, dimethylaniline, pyridine, and the like.

The reaction temperatures in both variants (a) and (b) of the production process are generally substantially between about 10°–100°C, preferably about 20°–50C.

In both process variants, the starting materials are expediently used in equimolar proportions, or the carbonic acid chloride (III) is used in a slight excess. The molar ratio is normally from 1:1 to 1:1.8.

In general, the reaction ends within 3 to 8 hours. The chloride formed in the reaction, for example alkali metal chloride or amine hydrochloride, may be filtered off and the new active compound of the formula (I) above may be obtained directly in crystalline form by concentration of the reaction solution or by recrystallization of the residue remaining behind after the solvent has been distilled off.

Advantageously, the active compounds of the present invention exhibit strong insecticidal and acaricidal activities, with low toxicity to warm-blooded animals and low phytotoxicity. The insecticidal and acaricidal effects set in rapidly and are long-lasting. The instant active compounds can therefore be used with very good results for the control of noxious sucking and biting insects, Diptera as well as mites (Acarina).

To the sucking insects contemplated herein mainly belong the aphids, such as the green peach aphid (*Myzus persicae*) and the bean aphid (*Doralis fabae*); the scales, such as *Aspidiotus hederae*, *Lecanium hesperidum* and *Pseudococcus maritimus;* the Thysanoptera, such as *Hercinothrips femoralis;* and the bugs, such as the beet bug (*Piesma quadrata*) and the bed bug (*Cimex Lectularius*), and the like.

With the biting insects contemplated herein there are mainly classed butterfly caterpillars, such as *Plutella maculipennis* and *Lymantria dispar;* beetles, such as granary weevils (*Sitophilus granarius*) and the Colorado beetle (*Leptinotarsa decemlineata*), and also species living in the soil, such as the wireworms (*Agriotes* species) and larvae of the cockchafer (*Melolontha melolontha*); cockroaches, such as the German cockroach (*Blattella germanica*); Orthoptera, such as the house cricket (*Gryllus domesticus*); termites, such as Reticulitermes; and Hymenoptera, such as ants; and the like.

The Diptera contemplated herein comprise in particular the flies, such as the vinegar fly (*Drosophila melanogaster*), the Mediterranean fruit fly (*Ceratitis capitata*), the house fly (*Musca domestica*) and mosquitoes, such as the yellow fever mosquito (*Aedes aegypti*); and the like.

In the case of the mites contemplated herein, particularly important are the spider mites (Tetranychidae) such as the two-spotted spider mite (*Tetranychus urticae*) and the European red mite (*Panonychus ulmi*); gall mites, such as the currant gall mite (*Eriophyes ribis*) and tarsonemids, such as *Tarsonemus pallidus;* and ticks; and the like Significantly, the instant active compounds also exhibit a fungitoxic potency against phytopathogenic fungi, particularly against bunt of wheat (*Tilletia caries*).

The active compounds according to the instant invention can be utilized, if desired, in the form of the usual formulations or compositions with inert conventional pesticidal diluents or extenders, i.e. inert conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.) alcohols (e.g. methanol, ethanol, propanol, butanol, etc.), amines (e.g. ethanolamine, etc.), ethers, ether-alchohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–20 percent, preferably 0.001–0.5 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95 percent, and preferably 0.001–95 percent, by weight of the mixture.

The active compounds can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process, it is possible to use highly concentrated liquid compositions with said liquid carrier vehicles containing from about 50 to about 90 percent by weight, or more generally from about 20 to about 95 percent by weight of active compound or even the 100 percent active substance alone, e.g. about 20–100 percent by weight of the active compound.

In particular, the present invention contemplates methods of selectively killing, combating or controlling pests, e.g. arthropods, i.e. insects and acarids, and more particularly, methods of combating at least one of insects and acarids which comprises applying to at least one of correspondingly (a) such insects, (b) such acarids, and (c) the corresponding habitat, i.e. the locus to be protected, a correspondingly combative or toxic amount, i.e., an arthropodicidally, especially insecticidally or acaricidally, effective amount of i.e. particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases it is possible to go above or below the aforementioned concentration ranges.

The outstanding activity of the particular new compounds of the present invention is illustrated without limitation by the following examples:

EXAMPLE 1

Plutella test
Solvent: 3 by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dew moist and are then infested with caterpillars of the diamond-back moth (*Plutella maculipennis*).

After the specified period of time, the degree of destruction is determined as a percentage: 100 percent means that all the caterpillars are killed whereas 0 percent means that move of the caterpillars are killed.

The particular active compounds tested, their concentrations, the evaluation time and the results obtained can be seen in Table 1.

TABLE 1
Plant-damaging insects

| Active compound | Concentration of active compound in percent | Degree of destruction in percent after 3 days |
|---|---|---|
| (A) 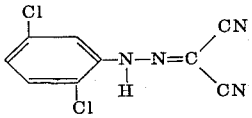 (known) | 0.2<br>0.02 | 100<br>0 |
| (2₁) 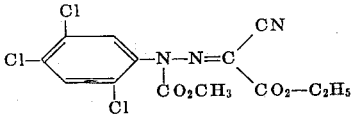 | 0.2<br>0.02 | 100<br>100 |
| (3₁) 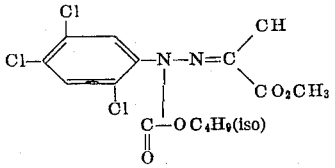 | 0.2<br>0.02 | 100<br>100 |
| (4₁) 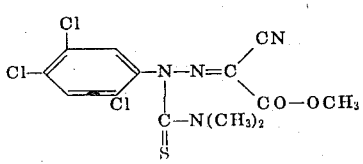 | 0.2<br>0.02 | 100<br>90 |

TABLE 1—Continued
Plant-damaging insects

| Active compound | Concentration of active compound in percent | Degree of destruction in percent after 3 days |
| --- | --- | --- |
| (5₁) 3,4,5-trichlorophenyl-N-N=C(CN)(CO₂-C₂H₅), CO₂-phenyl | 0.2<br>0.02 | 100<br>60 |
| (6₁) 3-CF₃, 4-Cl-phenyl-N-N=C(CN)(CO₂-CH₃), C(=S)-N(CH₃)₂ | 0.2<br>0.02 | 100<br>95 |
| (7₁) 3,5-bis(CF₃)-phenyl-N-N=C(CN)(CO₂-CH₃), CO₂-phenyl | 0.2<br>0.02 | 100<br>100 |
| (8₁) 4-CF₃, 2-Cl-phenyl-N-N=C(CN)(CO₂CH₃), C(=O)-OC₃H₇-n | 0.2<br>0.02<br>0.002 | 100<br>100<br>100 |
| (9₁) 4-CF₃, 2-Cl-phenyl-N-N=C(CN)(CO₂-CH₃), C(=O)-OCH₂-CH(CH₃)₂ | 0.2<br>0.02 | 100<br>95 |
| (10₁) 3,4,5-trichlorophenyl-N-N=C(CN)(CO₂-CH₃), C(=O)-OC₂H₅ | 0.2<br>0.02 | 100<br>70 |
| (11₁) 3,4,5-trichlorophenyl-N-N=C(CN)(CO₂-CH₃), C(=O)-OC₃H₇-n | 0.2<br>0.02 | 100<br>90 |

EXAMPLE 2

Phaedon larvae test
Solvent: 3 parts by weight acetone
Emulsifier: 1 by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with this preparation of the given active compound until dripping wet and are then infested with mustard beetle larvae (*Phaedon cochleariae*).

After the period of time stated in Table 2, the degree of destruction of the pests is determined and expressed as a percentage: 100 percent means that all, and 0 percent means that none, of the beetle larvae are killed.

The particular active compounds tested, their concentrations, the evaluation time and the experimental results obtained can be seen from Table 2.

TABLE 2
Plant-damaging insects

| Active compound | Concentration of active compound in percent | Degree of destruction in percent after 3 days |
|---|---|---|
| (A) 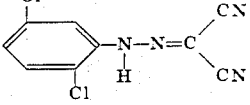 | 0.2<br>0.02 | 100<br>0 |
| (12₁) (known) 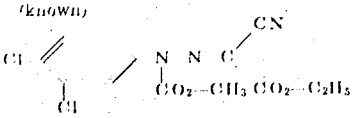 | 0.2<br>0.02 | 100<br>70 |
| (13₁) 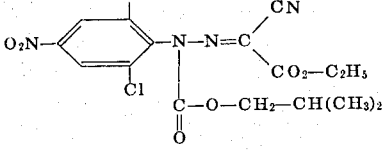 | 0.2<br>0.02<br>0.002 | 100<br>100<br>90 |
| (14₁) 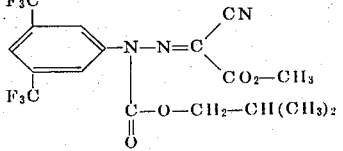 | 0.2<br>0.02<br>0.002 | 100<br>100<br>90 |

EXAMPLE 3

Tetranychus test
Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are then heavily infested with spider mites (*Tetranychus urticae*) in all stages of development.

After the specified period of time, the degree of effectiveness of the preparation of the given active compound is determined by counting the dead mites. The degree of destruction thus obtained is expressed as a percentage: 100 percent means that all the spider mites are killed whereas 0 percent means that none of the spider mites are killed.

The particular active compounds tested, their concentrations, the evaluation time and the results obtained can be seen from Table 3.

TABLE 3
Plant-damaging insects

| Active compound | Concentration of active compound in percent | Degree of destruction in percent after 8 days |
|---|---|---|
| (A) 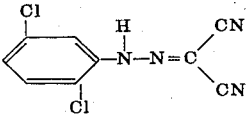 (known) | 0.2<br>0.02 | 70<br>0 |
| (6₂) 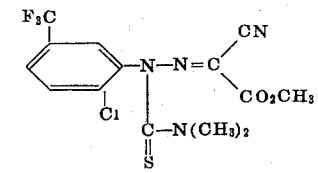 | 0.2<br>0.02 | 100<br>80 |

EXAMPLE 4

The procedure of Example 1 is repeated using the compounds and obtaining the results given in Table 4.

TABLE 4
Plant-damaging insects

| Active compound | Concentration of active compound in percent | Degree of destruction in percent after 3 days |
|---|---|---|
| (8₂) 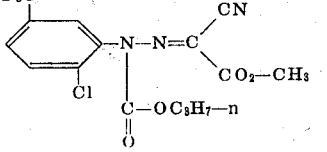 | 0.2<br>0.02<br>0.002 | 100<br>100<br>100 |

TABLE 4—Continued

Plant-damaging insects

| Active compound | Concentration of active compound in percent | Degree of destruction in percent after 3 days |
|---|---|---|
| ($9_2$) F$_3$C—C$_6$H$_3$(Cl)—N(C(=O)OCH$_2$—CH(CH$_3$)$_2$)—N=C(CN)(CO$_2$—CH$_3$) | 0.2<br>0.02 | 100<br>95 |
| ($10_2$) Cl$_3$C$_6$H$_2$—N(C(=O)OC$_2$H$_5$)—N=C(CN)(CO$_2$—CH$_3$) | 0.2<br>0.02 | 100<br>70 |
| ($11_2$) Cl$_3$C$_6$H$_2$—N(C(=O)OC$_3$H$_7$—n)—N=C(CN)(CO$_2$—CH$_3$) | 0.2<br>0.02 | 100<br>90 |

EXAMPLE 5

The procedure of Example 2 is repeated using the compounds and obtaining the results given in Table 5.

TABLE 5

Plant-damaging insects

| Active compound | Concentration of active compound in percent | Degree of destruction in percent after 3 days |
|---|---|---|
| ($15_1$) (F$_3$C)$_2$C$_6$H$_3$—N(C(=O)OCH$_3$)—N=C(CN)(CO—C(CH$_3$)$_3$) | 0.2<br>0.02<br>0.02<br>0.002 | 100<br>100<br>100<br>85 |
| ($16_1$) (F$_3$C)$_2$C$_6$H$_3$—N(C(=O)OCH$_3$)—N=C(CN)(CO$_2$—CH$_3$) | 0.2<br>0.02<br>0.002 | 100<br>100<br>90 |
| ($17_1$) (F$_3$C)$_2$C$_6$H$_3$—N(C(=O)OC$_3$H$_7$—n)—N=C(CN)(CO$_2$—CH$_3$) | 0.2<br>0.02 | 100<br>100 |
| ($18_1$) (F$_3$C)$_2$C$_6$H$_3$—N(C(=O)OCH(CH$_3$)—CH$_3$)—N=C(CN)(CO$_2$—CH$_3$) | 0.2<br>0.02 | 100<br>100 |
| ($19_1$) (F$_3$C)$_2$C$_6$H$_3$—N(C(=O)OC$_4$H$_9$—n)—N=C(CN)(CO$_2$—CH$_3$) | 0.2<br>0.02 | 100<br>100 |

TABLE 5—Continued

| Active compound | Concentration of active compound in percent | Degree of destruction in percent after 3 days |
|---|---|---|
| (20₁) 3,5-bis(CF₃)-C₆H₃-N(C(O)SC₂H₅)-N=C(CN)(CO₂CH₃) | 0.2 / 0.02 / 0.002 | 100 / 100 / 65 |
| (21₁) 2,4-Cl₂-C₆H₃-N(C(O)OCH₃)-N=C(CN)(CO₂CH₃) | 0.2 / 0.02 | 100 / 100 |
| (22₁) 2,5-Cl₂-C₆H₃-N(C(O)OC₂H₅)-N=C(CN)(CO₂CH₃) | 0.2 / 0.02 | 100 / 90 |
| (23₁) 3,4-Cl₂-C₆H₃-N(C(O)OC₄H₉-n)-N=C(CN)(CO₂CH₃) | 0.2 / 0.02 | 100 / 100 |
| (24₁) 3,4-Cl₂-C₆H₃-N(C(O)OCH₂—CH(CH₃)₂)-N=C(CN)(CO₂CH₃) | 0.2 / 0.02 | 100 / 100 |
| (25₁) 2,4,5-Cl₃-C₆H₂-N(C(O)OCH₃)-N=C(CN)(CO₂CH₃) | 0.2 / 0.02 | 100 / 100 |
| (26₁) 2,4,5-Cl₃-C₆H₂-N(C(O)OC₄H₉-n)-N=C(CN)(CO₂CH₃) | 0.2 / 0.02 | 100 / 100 |

EXAMPLE 6

The procedure of Example 3 is repeated using the compound and obtaining the results given in Table 6.

EXAMPLE 7

The procedure of Example 2 is repeated using the compound and obtaining the results given in Table 6.

TABLE 6
Plant-damaging insects

| Active compound | Concentration of active compound in percent | Degree of destruction in percent after 8 days |
|---|---|---|
| (15₂) 3,5-bis(CF₃)-C₆H₃-N(C(O)OCH₃)-N=C(CN)(CO—C(CH₃)₃) | 0.2 / 0.02 | 100 / 98 |

TABLE 7
Plant-damaging insects

| Active compound | Concentration of active compound in percent | Degree of destruction in percent after 3 days |
|---|---|---|
| (27₁) 3,4-Cl₂C₆H₃-N=C(CN)-CO-C(CH₃)₃, N-C(=O)-OC₆H₁₃n | 0.2<br>0.02 | 100<br>80 |
| (28₁) 3,4-Cl₂C₆H₃-N=C(CN)-CO-C(CH₃)₃, N-C(=O)-OC₈H₁₇n | 0.2<br>0.02 | 100<br>95 |
| (29₁) 3,5-(F₃C)₂C₆H₃-N=C(CN)-CO₂-CH₃, N-C(=O)-OC₅H₁₁-n | 0.2<br>0.02<br>0.002<br>0.0002 | 100<br>100<br>100<br>75 |
| (30₁) 3,5-(F₃C)₂C₆H₃-N=C(CN)-CO₂-CH₃, N-C(=O)-OC₆H₁₃-n | 0.2<br>0.02<br>0.002<br>0.0002 | 100<br>100<br>100<br>75 |
| (31₁) 3,5-(F₃C)₂C₆H₃-N=C(CN)-CO₂-CH₃, N-C(=O)-OC₈H₁₇n | 0.2<br>0.02<br>0.002 | 100<br>100<br>90 |
| (32₁) 3,5-(F₃C)₂C₆H₃-N=C(CN)-CO₂-CH₃, N-C(=O)-OCH₂-C(CH₃)₂-(CH₂)₃CH₃ | 0.2<br>0.02<br>0.002 | 100<br>98<br>50 |
| (33₁) 3,4-Cl₂C₆H₃-N=C(CN)-CO-C(CH₃)₃, N-C(=O)-OCH₃ | 0.2<br>0.02<br>0.002 | 100<br>100<br>100 |
| (34₁) 3,4-Cl₂C₆H₃-N=C(CN)-CO-C(CH₃)₃, N-C(=O)-OC₂H₅ | 0.2<br>0.02 | 100<br>100 |
| (35₁) 3,4-Cl₂C₆H₃-N=C(CN)-CO-C(CH₃)₃, N-C(=O)-OC₃H₇n | 0.2<br>0.02 | 100<br>100 |
| (36₁) 3,4-Cl₂C₆H₃-N=C(CN)-CO-C(CH₃)₃, N-C(=O)-OC₄H₉n | 0.2<br>0.02 | 100<br>100 |

TABLE 7—Continued

| Active compound | Concentration of active compound in percent | Degree of destruction in percent after 3 days |
|---|---|---|
| (37₁) 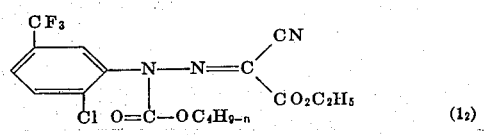 | 0.2<br>0.02<br>0.002 | 100<br>100<br>30 |

The following further Examples illustrate, without limitation, the process for producing the particular new compounds of the present invention.

EXAMPLE 8

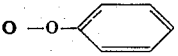

180 g (0.5 mol) dry potassium salt of cyano-carboethoxy-carbonyl -(2-chloro-5-trifluoromethyl-phenyl)-hydrazone are suspended in 1.5 liters acetonitrile, and added to 82 g (0.6 mol) chloroformic acid n-butyl ester in 100 ml acetonitrile. Stirring is then effected for 8 hours at 50°C. The solution fades from brown to pale yellow, and potassium chloride is precipitated. After cooling, the solvent is distilled off in a vacuum and the residue is recrystallized from benzine.

181 g (86 percent of the theory) of N-carbo-n-butoxy-(cyano-carboethoxy-carbonyl)-(2-chloro-5-trifluoromethyl-phenyl)-hydrazone, i.e. N-(carbo-n-butoxy)-N-(2-chloro-5-trifluoromethyl-phenyl)-N' -(cyano-carboethoxy-carbonyl)-hydrazone, are obtained as colorless needles of m.p. 98°C.

The potassium salt used as starting material can be prepared for example as follows:

1 mol of the corresponding phenylhydrazone is suspended in ethanol, the mixture is heated to 60°C, and 1 mol of ethanolic solution of potassium hydroxide is added. After a short time, the potassium salt is precipitated. After cooling, the salt is filtered off with suction, washed with ether and dried at 80°–100°C in a vacuum.

EXAMPLE 9

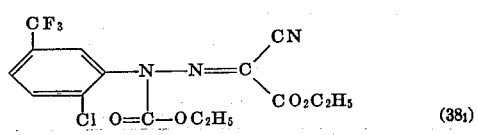

32 g (0.1 mol) cyano-carboethoxy-carbonyl-(2-chloro-5-trifluoromethylphenyl)-hydrazone are dissolved in 300 ml abs. acetone, and 15.1 g (0.15 mol) triethylamine are added. 16 g (0.15 mol) chloroformic acid ethyl ester dissolved in 50 ml abs. acetone are slowly added dropwise at room temperature, with stirring. The reaction solution heats up. Stirring is then continued for 2 hours at 40°C. Filtration from the precipitated hydrochloride is effected and the acetone is distilled off in a vacuum. The residue is recrystallized from ligroin.

25 g (69 percent of the theory) of N-carboethoxy-(cyano-carboethoxy-carbonyl)-(2-chloro-5-trifluoromethyl-phenyl)-hydrazone, i.e. N-(carboethoxy)-N-(2-chloro-5-trifluoromethyl-phenyl)-N'-(cyano-carboethoxy-carbonyl)-hydrazone,are obtained as colorless crystals of m.p. 140°C.

The phenylhydrazone used as starting material can be prepared for example as follows:

1 mol of the corresponding hydrazone is suspended in ethanol, the solution is heated to about 60°C, and 1 mol of potassium hydroxide solution dissolved in ethanol is added. Stirring is continued for 15 minutes, followed by concentration to dryness in a vacuum. The residue is suspended with ether and filtered off with suction. The potassium salt obtained is dried at 80°–100b$LC$ in a vacuum.

EXAMPLE 10

In manner analogous to that described in Examples 8 and 9, the compounds of Example 10 can be prepared. In these instances the radicals indicated correspond to those in formula (I) above.

| cmpd. | X | Y | Z | A | B | m.p. (°C) |
|---|---|---|---|---|---|---|
| (39₁) | CN | OC₂H₅ | 3,4-Cl₂ | O | -OC₂H₅ | 136 |
| (40₁) | CN | OC₂H₅ | 4-NO₂ | O | OC₂H₅ | 137 |
| (41₁) | CN | OC₂H₅ | 2-Cl | O | —O—⟨⟩ | 108 |
| (42₁) | CN | OC₂H₅ | 2-Cl | O | O-C₄H₉-n | 104 |
| (43₁) | CN | OC₂H₅ | 2,4-(CH₃)₂, 6-NO₂ | O | OC₂H₅ | 131 |
| (12₂) | CN | OC₂H₅ | 3,4-Cl₂ | O | OCH₃ | 144 |
| (44₁) | CN | OC₂H₅ | 2-Cl, 5-CF₃ | | —O—⟨⟩ | 124 |
| (45₁) | CN | OC₂H₅ | 2,4-(CH₃)₂, 6-NO₂ | O | OCH₃ | 157 |
| (2₂) | CN | OC₂H₅ | 2,4,5-Cl₃ | O | OCH₃ | 145 |
| (46₁) | CN | OCH₃ | 2-Cl, 5-CF₃ | O | OCH₃ | 226 |
| (7₂) | CN | OCH₃ | 3,5-(CF₃)₂ | O | —O—⟨⟩ | 153 |
| (47₁) | CN | OC₂H₅ | 2-Cl, 5CF₃ | S | -N(CH₃)₂ | 122 |
| (48₁) | CN | OC₂H₅ | 4-SO₂CH₃ | O | OCH₃ | 225 |
| (5₂) | CN | OC₂H₅ | 2,4,5-Cl₃ | O | —O—⟨⟩ | 152 |
| (6₃) | CN | OCH₃ | 2-Cl, 5-CF₃ | S | -N(CH₃)₂ | 119 –123 |
| (3₂) | CN | OCH₃ | 2,4,5-Cl₃ | O | OCH₂CH(CH₃)₂ | 131 |
| (4₂) | CN | OCH₃ | 2,4,5-Cl₃ | S | -N(CH₃)₂ | 152–154 |
| (49₁) | CN | OCH₃ | 2,6-Cl₂, 4-NO₂ | O | OCH₂CH(CH₃)₂ | 110 |
| (50₁) | CN | OC₂H₅ | 2,4-(NO₂)₂ | O | OCH₂CH(CH₃)₂ | 194 |
| (51₁) | CN | OC₂H₅ | 2,4-(NO₂)₂ | O | OCH₃ | 195 |
| (14₂) | CN | OCH₃ | 3,5-(CF₃)₂ | O | OCH₂CH(CH₃)₂ | 123 |
| (52₁) | CN | OCH₃ | 2,6-Cl₂, 4-NO₂ | O | OCH₂CH(CH₃)₂ | 103 |
| (53₁) | CN | OCH₃ | 2,6-Cl₂, 4-NO₂ | O | OC₂H₅ | 122 |
| (16₂) | CN | OCH₃ | 3,5-(CF₃)₂ | O | OCH₃ | 183 |

| cmpd. | X | Y | Z | A | B | m.p. (°C) |
|---|---|---|---|---|---|---|
| (54₁) | CN | OCH₃ | 3,5-(CF₃)₂ | O | S-C₄H₉-n | 194 |
| (55₁) | CN | OCH₃ | 2,4,5-Cl₃ | O | S-C₄H₉-n | 123 |
| (56₁) | CN | OCH₃ | 3,5-(CF₃)₂ | S | N(CH₃)₂ | 177 |
| (19₂) | CN | OCH₃ | 3,5-(CF₃)₂ | O | OC₄H₉-n | 132 |
| (20₂) | CN | OCH₃ | 3,5-(CF₃)₂ | O | SC₂H₅ | 209 |
| (9₃) | CN | OCH₃ | 2-Cl, 5-CF₃ | O | OCH₂CH(CH₃)₂ | 99 |
| (57₁) | CN | OCH₃ | 2-Cl, 5-CF₃ | O | OC₂H₅ | 164 |
| (58₁) | CN | OCH₃ | 2-CF₃, 4-Cl | O | OCH₃ | 171 |
| (21₂) | CN | OCH₃ | 3,5-Cl₂ | O | OCH₃ | 213 |
| (22₂) | CN | OCH₃ | 3,5-Cl₂ | O | OC₂H₅ | 224 |
| (24₂) | CN | OCH₃ | 3,5-Cl₂ | O | OCH₂CH(CH₃)₂ | 142 |
| (23₂) | CN | OCH₃ | 3,5-Cl₂ | O | OC₄H₉-n | 152 |
| (59₁) | CN | OCH₃ | 2,4,5-Cl₃ | O | OCH₃ | 156 |
| (10₃) | CN | OCH₃ | 2,4,5Cl₃ | O | OC₂H₅ | 166 |

EXAMPLE 11

In a manner analogous to that described in Examples 8 and 9, the compounds of Example 11 can be prepared. In these instances the radicals indicated correspond to those in formula (I) above.

| cmpd. | X | Y | Z | A | B | m.p. (°C) |
|---|---|---|---|---|---|---|
| (18₂) | CN | OCH₃ | 3,5(CF₃)₂ | O | OCH(CH₃)₂ | 141-142 |
| (60₁) | CN | OCH₃ | 2,4,5-Cl₃ | O | OCH(CH₃)₂ | 169-172 |
| (17₂) | CN | OCH₃ | 3,5(CF₃)₂ | O | OC₃H₇-n | 140-143 |
| (8₃) | CN | OCH₃ | 2-Cl-5-CF₃ | O | OC₃H₇-n | 111-114 |
| (11₃) | CN | OCH₃ | 2,4,5-Cl₃ | O | OC₃H₇-n | 139-143 |
| (61₁) | CN | OCH₃ | 3,5-Cl₂ | O | OC₃H₇-n | 195-197 |
| (15₃) | CN | C(CH₃)₃ | 3,5-(CF₃)₂ | O | OCH₃ | 107-109 |
| (34₂) | CN | C(CH₃)₃ | 3,5-Cl₂ | O | OC₂H₅ | 125-128 |
| (35₂) | CN | C(CH₃)₃ | 3,5-Cl₂ | O | OC₃H₇-n | 95-98 |
| (62₁) | CN | C(CH₃)₃ | 3,5-Cl₂ | O | OC₃H₇-i | 134 |
| (36₂) | CN | C(CH₃)₃ | 3,5-Cl₂ | O | OC₄H₉-n | 108-110 |
| (37₂) | CN | C(CH₃)₃ | 3,5-Cl₂ | O | OC₅H₁₁-n | 87-89 |
| (27₂) | CN | C(CH₃)₃ | 3,5Cl₂ | O | OC₆H₁₂-n | 81-83 |
| (28₂) | CN | C(CH₃)₃ | 3,5-Cl₂ | O | OC₈H₁₇-n | 66-68 |
| (63₁) | CN | C(CH₃)₃ | 3,5-Cl₂ | O | OCH₂−C(CH₃)₂−C₄H₉-n | 71-72 |
| (33₂) | CN | C(CH₃)₃ | 3,5-Cl₂ | O | OCH₃ | 125-127 |
| (29₂) | CN | OCH₃ | 3,5-(CF₃)₂ | O | OC₅H₁₁-n | 95 |
| (30₂) | CN | OCH₃ | 3,5-(CF₃)₂ | O | OC₆H₁₃-n | 89 |
| (32₂) | CN | OCH₃ | 3,5-(CF₃)₂ | O | OCH₂−C(CH₃)₂−C₄H₉-n | 92 |
| (64₁) | CN | OCH₃ | 3,5-(CF₃)₂ | O | O−C₆H₁₁ | 126 |
| (31₂) | CN | OCH₃ | 3,5-(CF₃)₂ | O | OC₈H₁₇-n | 70-72 |
| (65₁) | CN | OCH₃ | 2-Cl, 5-CF₃ | O | OC₆H₁₃-n | 92-94 |

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, the terms "arthropod," "arthropodicidal and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. A method of combating arthropods which comprises applying to said arthropods or their habitat an effective arthropodicidal amount of a compound of the formula

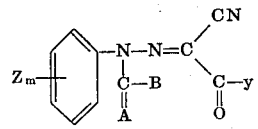

in which Y is selected from the group consisting of alkyl of one to four carbon atoms and alkoxy of one to four carbon atoms, each Z individually is selected from the group consisting of alkyl or alkylsulfonyl of one to four carbon atoms, chloro, nitro and trifluoromethyl, m is a whole number from 1-3, A is selected from the group consisting of oxygen and sulfur, and B is selected from the group consisting of alkoxy of one to eight carbon atoms, phenoxy, alkyl-mercapto of one to four carbon atoms, cyclohexyloxy and dialkylamino having one to two carbon atoms in each alkyl moiety.

2. The method according to claim 1 in which Y is selected from the group consisting of $C_{1-4}$ alkyl and $C_{1-4}$ alkoxy, each Z individually is selected from the group consisting of methyl, chloro, trifluoromethyl, nitro and methylsulfonyl, m is 13, A is oxygen and B is selected from the group consisting of $C_{1-8}$ alkoxy, phenoxy and $C_{1-4}$ alkylmercapto.

3. The method according to claim 1 in which Y is selected from the group consisting of $C_{1-4}$ alkyl and $C_{1-4}$ alkoxy, each Z individually is selected from the group consisting of methyl, chloro, trifluoromethyl, nitro and methylsulfonyl, m is 1-3, A is sulfur and B is di($C_{1-2}$ alkyl)amino.

4. The method according to claim 1 wherein such compound is N-(carbo-methoxy)-N-(2,4,5-trichlorophenyl)-N'-(cyano-carboethoxy-carbonyl)-hydrazone of the formula

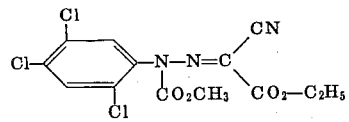

5. The method according to claim 1 wherein such compound is N-(dimethylamino-thiono)-N-(2-chloro-5-trifluoromethyl-phenyl)-N'-(cyano-carbomethoxy-carbonyl)-hydrazone of the formula

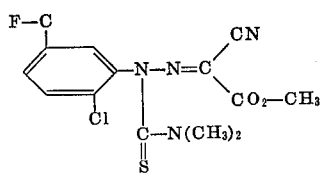

6. The method according to claim 1 wherein such compound is N-(carbo-phenoxy)-N-[3,5-bis(trifluoromethyl)-phenyl]-N'-(cyano-carbomethoxy-carbonyl)-hydrazone of the formula

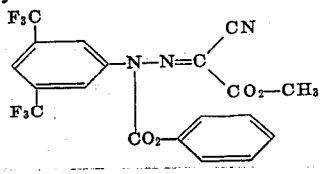

7. The method according to claim 1 wherein such compound is N-(carbo-iso butoxy)-N-(2,6-dichloro-4-nitro-phenyl)-N'-(cyano-carboethoxy-carbonyl)-hydrazone of the formula

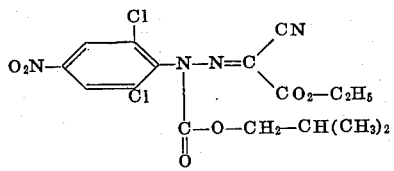

8. The method according to claim 1 wherein such compound is N-(carbo-methoxy)-N-[3,5-bis(trifluoromethyl)-phenyl]-N'-(cyano-1',1'-dimethylpropanoyl-carbonyl)-hydrazone of the formula

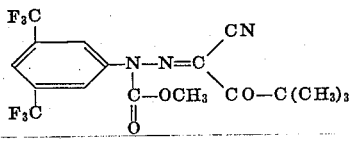

9. An arthropodicidal composition comprising an effective arthropodicidal amount of a compound of the formula

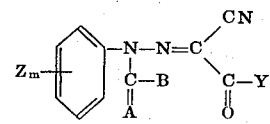

in which Y is selected from the group consisting of alkyl of one to four carbon atoms and alkoxy of one to four carbon atoms, each Z individually is selected from the group consisting of alkyl or alkysulfonyl of one to four carbon atoms, chloro, nitro and trifluoromethyl, $m$ is a whole number from 1–3, A is selected from the group consisting of oxygen and sulfur, and B is selected from the group consisting of alkoxy of one to eight carbon atoms, phenoxy, alkyl-mercapto of one to four carbon atoms, cyclohexyloxy and dialkylamino having one to two carbon atoms in each alkyl moiety and a carrier.

10. The composition according to claim 9 wherein such compound is selected from the group consisting of
N-(carbo-methoxy)-N-(2,4,5-trichloro-phenyl)-N'-(cyano-carboethoxy-carbonyl)-hydrazone;
N-(dimethylamino-thiono)-N-(2-chloro-5-trifluoromethyl-phenyl)-N'-(cyano-carbomethoxy-carbonyl)-hydrazone;
N-(carbo-phenoxy)-N-[3,5-bis(trifluoromethyl)-phenyl]-N'-(cyano-carbomethoxy-carbonyl)-hydrazone;
N-(carbo-iso butoxy)-N-(2,6-dichloro-4-nitro-phenyl)-N'-(cyano-carboethoxy-carbonyl)-hydrazone; and
N-(carbo-methoxy)-N-[3,5-bis(trifluoromethyl)-phenyl]-N'-(cyano-1',1'-dimethylpropanoyl-carbonyl)-hydrazone.

* * * * *

UNITED STATES PATENT OFFICE
CERTIFICATE OF CORRECTION

Patent No. 3,689,664            Dated September 5, 1972

Inventor(s) Karl Heinz Buchel et al

It is certified that error appears in the above-identified patent and that said Letters Patent are hereby corrected as shown below:

Front Page - "Foreign Claims Priority" missing should be

"Germany, January 2, 1968, No. P 16 68 071.0"

In the Abstract, lines 6-7

"carboalkoxyl]" should be -- carboalkoxy] --.

Col. 3, line 54

"91" should be -- In --.

Col. 3, line 55

"tetr.-" should be -- tert.- --.

Col. 3, line 61

"1-3" should be -- 2-3 --.

Col. 8, Table 1 Comp. 3$_1$

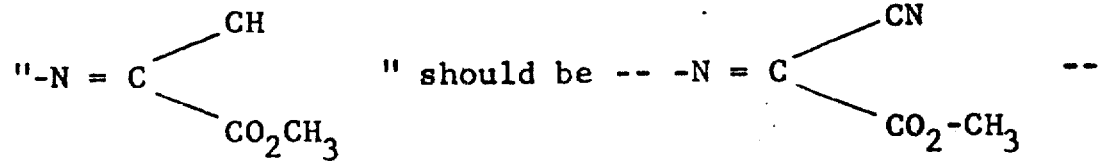

UNITED STATES PATENT OFFICE
CERTIFICATE OF CORRECTION

Patent No. 3,689,664      Dated September 5, 1972

Inventor(s) Karl Heinz Buchel et al

It is certified that error appears in the above-identified patent and that said Letters Patent are hereby corrected as shown below:

Col. 11, Table 2 Comp. ($12_1$)

formula is printed very light - difficult to read bonds.

Col. 17, Table 7 (Comp. $28_1$)

$$\text{"} \begin{array}{c} -N- \\ | \\ C- \\ | \\ O \end{array} \text{"} \quad \text{should be} \quad -- \begin{array}{c} -N- \\ | \\ C- \\ \| \\ O \end{array} --$$

Col. 17, Table 7 (Comp. $31_1$)

$$\text{"} \begin{array}{c} | \\ C \diagdown \\ \| \quad OC_3H_{17}n \\ O \end{array} \text{"} \quad \text{should be} \quad -- \begin{array}{c} | \\ C \diagdown \\ \| \quad OC_8H_{17}n \\ O \end{array} --$$

Col. 20, line 27

"-100 bLC" should be -- - 100°C --.

UNITED STATES PATENT OFFICE
CERTIFICATE OF CORRECTION

Patent No. 3,689,664      Dated September 5, 1972

Inventor(s) Karl Heinz Buchel et al

It is certified that error appears in the above-identified patent and that said Letters Patent are hereby corrected as shown below:

Col. 22, line 20

$$"\ =C{\diagdown\atop C-y \atop \|\atop O}\ "\ \text{should be} --\ =C{\diagdown\atop C-Y \atop \|\atop O}\ --$$

Col. 22, line 39

"13" should be -- 1-3 --

Col. 22, line 62

"F-C" should be -- $F_3C$ --

Signed and sealed this 8th day of May 1973.

(SEAL)
Attest:

EDWARD M. FLETCHER, JR.
Attesting Officer

ROBERT GOTTSCHALK
Commissioner of Patents